(12) United States Patent
Nishi

(10) Patent No.: US 7,045,074 B2
(45) Date of Patent: May 16, 2006

(54) MAGNETIC CLUSTER, MAGNETIC RECORDING MEDIUM, METHOD FOR FABRICATING A MAGNETIC CLUSTER AND METHOD FOR FABRICATING A MAGNETIC RECORDING MEDIUM

(75) Inventor: Nobuyuki Nishi, Okazaki (JP)

(73) Assignee: Okazaki National Research Institutes, Okazaki (JP)

( * ) Notice: Subject to any disclaimer, the term of this patent is extended or adjusted under 35 U.S.C. 154(b) by 0 days.

(21) Appl. No.: 10/347,600

(22) Filed: Jan. 22, 2003

(65) Prior Publication Data
US 2004/0028948 A1    Feb. 12, 2004

(30) Foreign Application Priority Data
Jan. 23, 2002    (JP) .............................. 2002-013694

(51) Int. Cl.
G11B 5/62    (2006.01)

(52) U.S. Cl. ................................ 252/62.51 R; 423/440

(58) Field of Classification Search ......... 252/62.51 R; 423/440

See application file for complete search history.

(56) References Cited

U.S. PATENT DOCUMENTS 3,228,882 A    1/1966    Harle et al.
5,547,748 A    8/1996    Ruoff et al.

FOREIGN PATENT DOCUMENTS

JP        02-98904     4/1990
JP        05-175031    7/1993

OTHER PUBLICATIONS

Nishi et al, "Formation and magnetic characteristics of cobalt-carbon nanocluster magnets embedded in amorphous carbon matrices", Chemical Physics Letters, vol. 369, (1-2), pp. 198-203, Jan. 15, 2003.*

Li et al, "Electronic structure and chemical bonding between the first row transition metals and C2:A photoelectron spectroscop stude of MC2- (M=Sc,V,Cr,Mn,Fe and Co)", Jour. Chem, Physics, vol. 11, No. 18, Nov. 8, 1999, pp. 8389-8395.*

Block et al., "The Magnetic Properties of Annealed Graphite-Coated Ni and Co Nanocrystals," IEEE Transactions on Magnetics, vol. 34, No. 4, Jul. 4, 1998.

* cited by examiner

Primary Examiner—C. Melissa Koslow
(74) Attorney, Agent, or Firm—Oliff & Berridge, PLC

(57)    ABSTRACT

A magnetic cluster includes a $(CoC_2)_4$ tetragonal structure with $Co-C_2-Co$ bonds, and a molecular formula $(CoC_2)_x$ (x: natural number).

6 Claims, 7 Drawing Sheets

MAGNETIC CLUSTER, MAGNETIC RECORDING MEDIUM, METHOD FOR FABRICATING A MAGNETIC CLUSTER AND METHOD FOR FABRICATING A MAGNETIC RECORDING MEDIUM

BACKGROUND OF THE INVENTION

This invention relates to a magnetic cluster, and a magnetic recording medium which are usable as a minute magnetic memory or an electron transmittance wire in an ultrafine electronic device using nano-technology. This invention also relates to a method for such a magnetic cluster and such a magnetic recording medium.

DESCRIPTION OF THE PRIOR ART

In an ultrafine electronic device using nano-technology, as a conductive nano-scale device have been developed a carbon nano-tube made by utilizing electric discharge and an integrated stick-like compound made by stacking plural porphyrin compounds. These are many problems as to how to join such a conductive nano-scaled device with another element.

In contrast, as a magnetic memory has been developed a magnetic recording medium where microparticles made of various kinds of inorganic compounds including transition metal and dispersed in a given matrix. In this case, the recording capacity of the magnetic recording media, it is required to reduce the microparticles in size. Concretely, a magnetic recording medium with manganese oxide clusters or iron oxide clusters dispersed has been developed. The exemplified magnetic recording medium cannot exhibit sufficiently and practically usable high blocking temperature of spin inversion.

SUMMARY OF THE INVENTION

It is an object of the present invention to provide a new magnetic cluster preferably usable as a conductive nano-scaled device or a magnetic memory in an ultrafine electronic device utilizing nano-technology, and a magnetic recording medium using the magnetic cluster. It is also an object of the present invention to provide a method for fabricating the magnetic cluster and a method for fabricating the magnetic recording medium.

In order to achieve the above object, this invention relates to a magnetic cluster comprising a $(CoC_2)_4$ tetragonal structure with Co—$C_2$—Co bonds, and a molecular formula $(CoC_2)_x$ (x: natural number).

Herein, the magnetic cluster means a single cluster or an aggregative structure according to the fabricating method. That is, the magnetic cluster may be composed of a single cluster or an aggregative structure.

The inventor had intensely studied to achieve the above-mentioned object, to succeed in fabricating the above-mentioned new magnetic cluster according to the present invention. In the present invention, the magnetic cluster has a $(CoC_2)_4$ tetragonal structure with Co—$C_2$—Co bonds, and has a molecular formula $(CoC_2)_x$ (x: natural number). Therefore, the magnetic cluster has a large spin quantum number per unit volume. And, the magnetic cluster has a large anisotropy, originated from the tetragonal structure.

By controlling the fabrication condition of the magnetic cluster appropriately, the size of the magnetic cluster can be set to be nano-meter-order. As a result, the magnetic cluster can have a high blocking temperature of spin inversion, thereby to be practically usable as a magnetic memory in an ultrafine electronic device field. In the practically use of the magnetic cluster as a magnetic memory, plural magnetic clusters as mentioned above are formed in nanometer-order, and then, dispersed in a given matrix to fabricate a magnetic recording medium as the magnetic memory.

In addition, since the magnetic cluster of nanometer-order can be easily joined with another element, the magnetic cluster is usable as a magnetic conductor or the like in the ultrafine electronic device field.

The magnetic cluster can exhibit ferrimagnetic property below 7 K when it is mixed with cobalt chloride. Also, the magnetic cluster can exhibit at least one of ferromagnetic property and paramagnetic property at room temperature. In addition, the magnetic cluster can have a coercive force at least 250 Gauss.

In order to stabilize the magnetic cluster structure, some hydrogen atoms, some halogen atoms such as F or Cl, some carbohydrate radicals, oxo or hydroxyl compounds, or aza or amino anions may be bonded to the outer side of the magnetic cluster structure.

Other features of the magnetic cluster and the magnetic recording medium of the present invention will be described in detail hereafter. Also, a fabricating method of magnetic cluster and a fabricating method of a magnetic recording medium which are according to the present invention will be described in detail hereafter.

BRIEF DESCRIPTION OF THE DRAWINGS

For better understanding of the present invention, reference is made to the attached drawings, wherein.

DESCRIPTION OF THE PREFERRED EMBODIMENTS

In order to practically use the magnetic cluster of the present invention as a magnetic memory in an ultrafine electronic device field, it is required to grow the magnetic cluster to nanometer-order, as mentioned above. The magnetic cluster includes a $(CoC_2)_4$ tetragonal structure and a molecular formula of $(CoC_2)_x$ (x: natural number). Therefore, in order to satisfy the above mentioned requirement, it is desired to set the length of the cluster to 3 nm or over, and the diameter of the cluster to 0.8 nm or over.

As mentioned above, the magnetic cluster may be composed of a single cluster or an aggregative structure, according to the fabricating method. In the aggregative structure, plural clusters are combined with one another. Therefore, in the present invention, magnetic cluster includes single meaning and plural meaning. The diameter of the aggregative structure is preferably set to not more than 12 nm. Although the magnetic cluster with a larger size than the above defined size can be fabricated, according to the fabricating method of the present invention, it is not preferably usable as a magnetic memory in the ultrafine electronic device field.

In a practical use of the magnetic cluster as the magnetic cluster as the magnetic memory, plural magnetic clusters are dispersed in a given matrix. The matrix may preferably include cobaltocene or cobaltocene derivatives with paramagnetic property such as bicobaltocene. The matrix may also include ferrocene or ferrocene derivative such as biferrocene with antiferromagnetic property. In this case, the residual magnetization of the magnetic cluster can be enhanced, and thus, can exhibit sufficient magnetic properties in the use as the magnetic memory.

The magnetic cluster can be made by means of optical illumination process (first method) or heating process second method), as will be described hereinafter. In this case, a cobalt carbonyl compound and a dichloromethane are mixed to form a dichloromethane solution where the cobalt carbonyl compound is dissolved. Then, by imparting a predetermined ultraviolet illumination process or a predetermined heating process to the dichloromethane solution, CO molecules are desorbed from the dichloromethane solution through the photochemical or the thermochemical reaction, thereby to create the desired magnetic cluster of the present invention.

As the cobalt carbonyl compound may be exemplified $Co_4(CO)_{12}$ or $Co_2(CO)_8$ and a cobalt carbonyl compound with a larger number of cobalt for the $Co_4(CO)_{12}$ through the reaction under a CO atmosphere.

Figure 1:
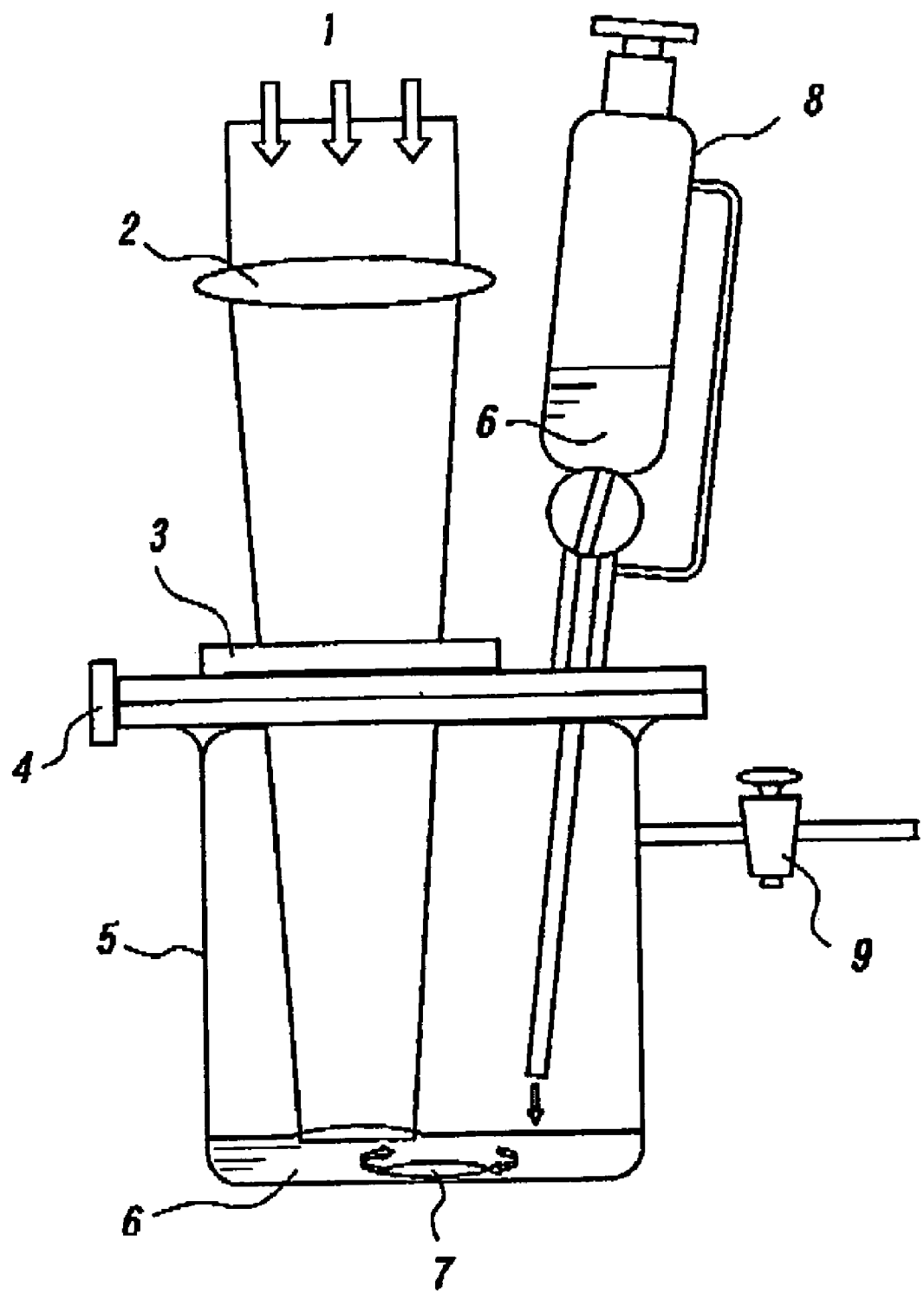
FIG. 1 is a structural view schematically showing an apparatus to be employed in the first method (use of optical illumination process), according to the present invention.

FIG. 1 is a structural view schematically showing an apparatus to be employed in the first method. In the apparatus shown in FIG. 1, the dichloromethane solution 6 is charged into the funnel 8, and then, dropped into the pressure-resistant glass vessel 5 sealed by the vacuum glass flange 4. Without the funnel 8, the dichloromethane solution may be charged into the glass vessel 5 in advance.

Then, an ultraviolet beam is introduced from the lamp 1 via the condenser 2 and the light-introducing window 3 onto the dichloromethane solution. In this time, the dichloromethane solution 6 is strongly agitated with the agitator 7, for example composed of a magnetic rotator covered with Teflon (registered trademark). During the agitation, CO molecules are desorbed from the dichloromethane solution 9, and then discharged from the cock 9.

A predetermined period of time elapsed, the residual solution in the glass vessel 5 is filtrated with a given filter (not shown), and washed sufficiently, thereby to provide blackish brown magnetic clusters according to the present invention.

Figure 2:
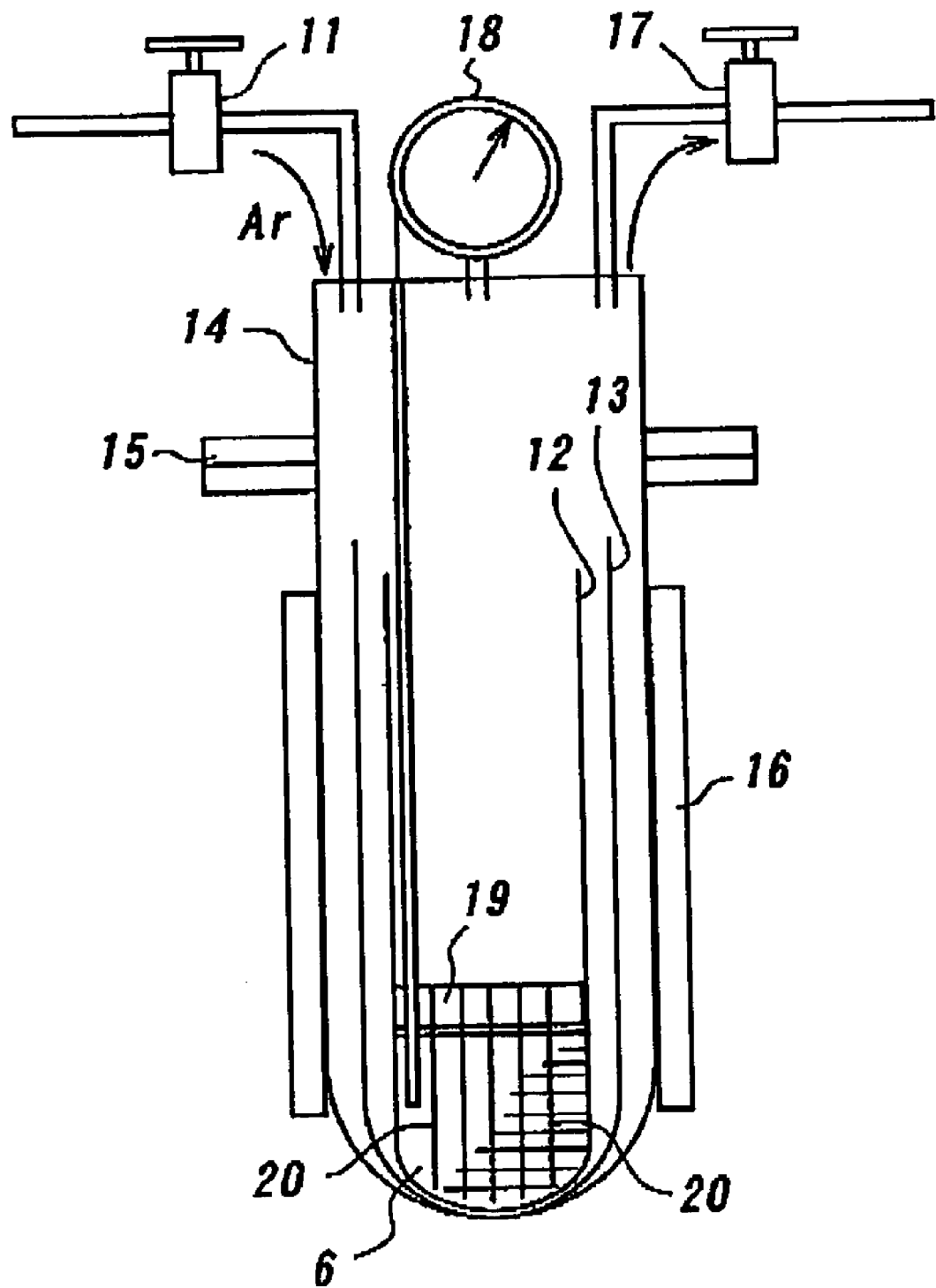
FIG. 2 is a structural view schematically showing an apparatus to be employed in a second method (use of heating process), according to the present invention.

The size of the magnetic cluster depends on the concentration of the cobalt carbonyl compound in the dichloromethane solution. If the concentration of the cobalt carbonyl compound is set within $10^{-4}$–$10^{-5}$M, only the magnetic clusters with blocking temperatures lower than 4 K can be provided. The size of the magnetic cluster is enlarged as the concentration of the cobalt carbonyl compound is increased. By the irradiation during 60 minutes or over using an ultra-high pressure mercury lamp as the lamp 1, the magnetic clusters with super paramagnetic property can be fabricated, FIG. 2 is a structural view schematically showing an apparatus to be employed in the second method. In the apparatus shown in FIG. 2, in the pressure-resistant stainless vessel 14 sealed vertically with the flange 15 are provided the Teflon (registered trademark) vessel 13 and the glass tube 12 in the vessel 13. The dichloromethane solution 6 is charged into the glass tube 12. At the bottom of the glass tube 12 is provided the glass plate hanger 19, from which the plural glass plates 20 are hung and immersed into the dichloromethane solution 6.

An Ar gas is introduced into the stainless vessel 14 via the Ar gas inlet tube 11, and thus, the interior of the stainless vessel 14 is charged and substituted by the Ar gas. in this case, water components are removed from the stainless vessel 14 as much as possible. Then, the dichloromethane solution 6 is heated to 200° C. or over, e.g., 210° C. with the heater 16 disposed over the periphery of the stainless vessel 14, and kept at the same temperature for a predetermined period of time, e.g., 10 minutes to four hours. In this case, Co molecules are desorbed from the dichloromethane solution 6 through the thermochemical reaction and then, discharged via the outlet tube 17. During the thermochemical reaction, the pressure inside the stainless vessel 14 is monitored with the pressure gauge 18 set on the top wall of the stainless vessel 14.

A predetermined period of time elapsed, the heater 16 is released, and the residual solution in the stainless vessel 14 is cooled with a fan (not shown), thereby to precipitate magnetic clusters in amorphous carbon. In this case, it is desired to remove $CoCl_2$ by washing with water. It is also desired to dry and crush the magnetic clusters, and subsequently, degassed and dehydrated with purified methanol, thereby to provide powdery magnetic clusters.

The size of the magnetic cluster depends on the period of the heating process. As the period of the heating process is elongated, the size of the magnetic cluster decreased. Also, the size of the magnetic cluster depends on the concentration of the cobalt carbonyl compound in the dichloromethane solution 6.

Prior to the heating process, it is desired to perform a preheating process for the dichloromethane solution. The pre-heating process can be performed, for example, by heating the dichloromethane solution 6 to about 100° C. and kept at the same temperature for an hour before the heating process of 200° C. or over. In this case, the yield of the magnetic clusters from the dichloromethane solution 6 increases.

The magnetic recording medium of the present invention can be fabricated as follows. A given matrix substance is added into a solution including the resultant magnetic clusters, and then, the magnetic clusters and the matrix substance are coprecipitated. In this case, the magnetic clusters are dispersed into the matrix, thereby to provide the desired magnetic recording medium.

Concretely, in the apparatus shown in FIG. 1 or FIG. 2, the matrix substance is directly added into the residual solution in the glass vessel 5 or the glass tube 12 to coprecipitate the magnetic clusters and the matrix substance. The magnetic recording medium may be fabricated as follows. First of all, the resultant magnetic clusters are dispersed into a dehydrated methanol, and then, filtered and dried. Then, the magnetic clusters are mixed with the matrix substance in a mortar under an Ar gas flow. The resultant mixture is dispersed and dissolved in a dichloromethane solution again by utilizing supersonic wave. The dichloromethane solution is filtrated and the magnetic clusters and the matrix substance are coprecipitated, thereby to provide the desired magnetic recording medium As mentioned above, each of the magnetic cluster is made of a single cluster or an aggregative structure.

As mentioned previously, the matrix substance may include cobaltocene or a cobeltocene derivative such as bicobaltocene with paramagnetic property, or ferrocene or a ferrocene derivative such as biferrocene with diamagnetic property.

Figure 3:
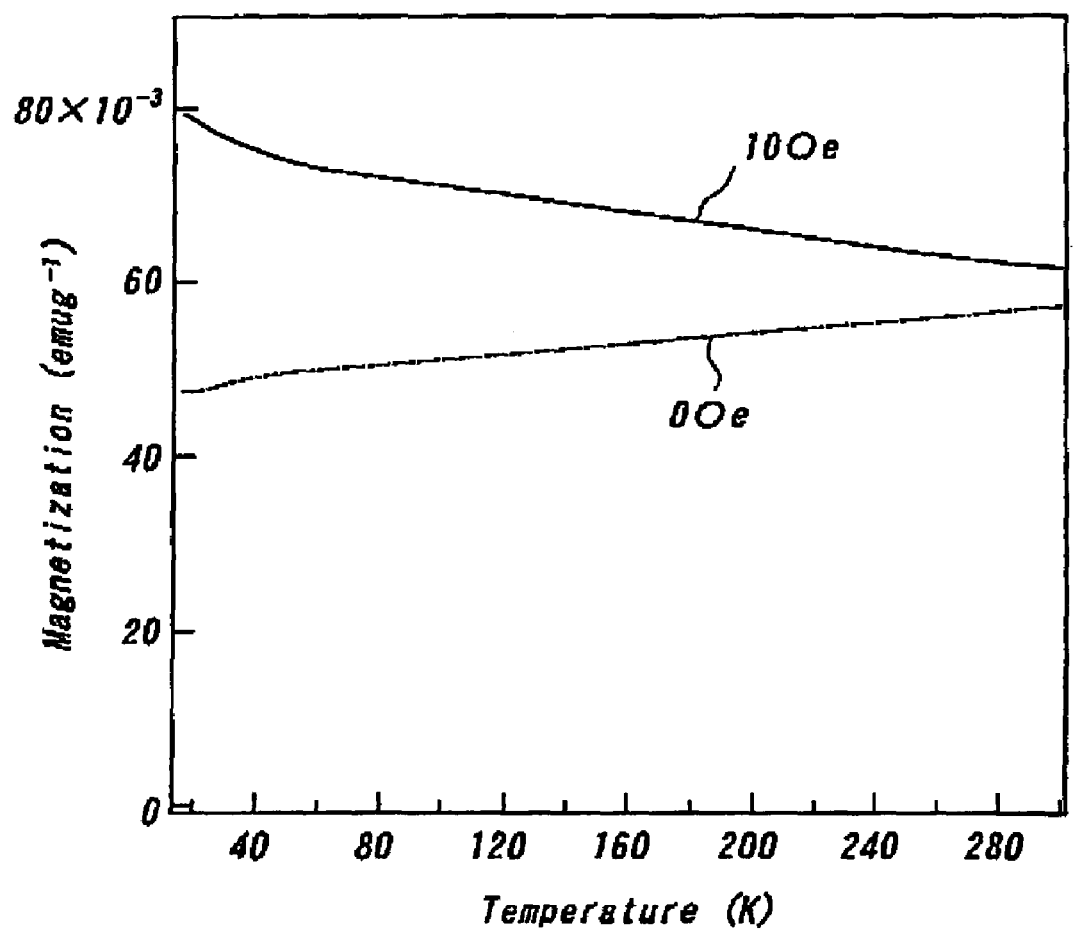
FIG. 3 is a graph showing a magnetization vs. temperature curves of a sample (at a cluster density of about 10%) fabricated according to the second method.

FIG. 3 is a graph showing magnetization vs. temperature curves of the magnetic cluster aggregative structures in amorphous carbon produced by the second method, of which each has a $(CoC_2)_4$ tetragonal structure with Co—$C_2$—Co bonds and a molecular formula of $(CoC_2)_x$ (x: natural number). The average diameter of the aggregative structure is 12 nm. The solid curve on the top is obtained after cooling under an external magnetic field at 10 Oe and the dotted curve on the bottom is obtained after cooling at zero-magnetic field. As is apparent from FIG. 3, the two curves behave just oppositely suggesting that nano-particles interact each other as magnets through magnetic dipole-dipole interaction even at room temperature.

Figure 4:
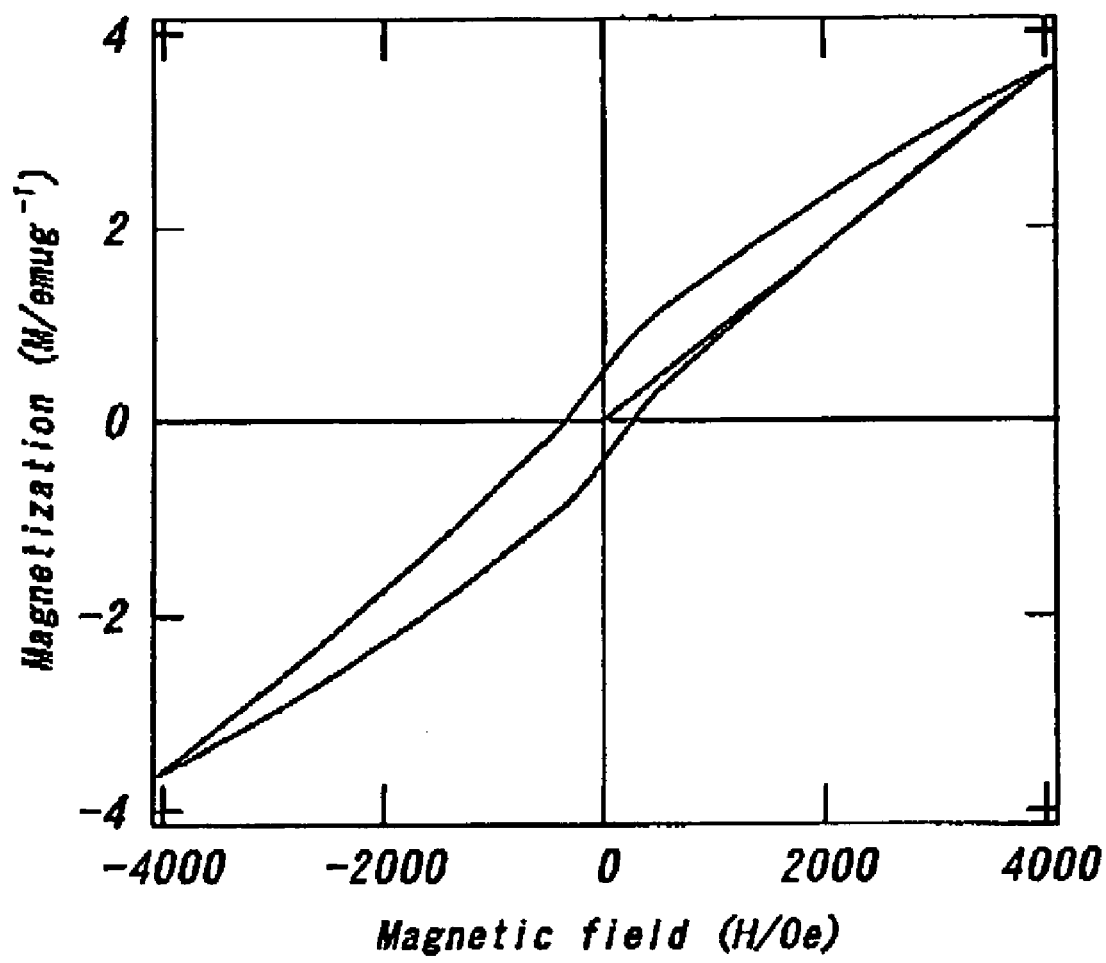
FIG. 4 is a hysteresis curve at 1.8 K of a sample fabricated according to the first method.
Figure 5:
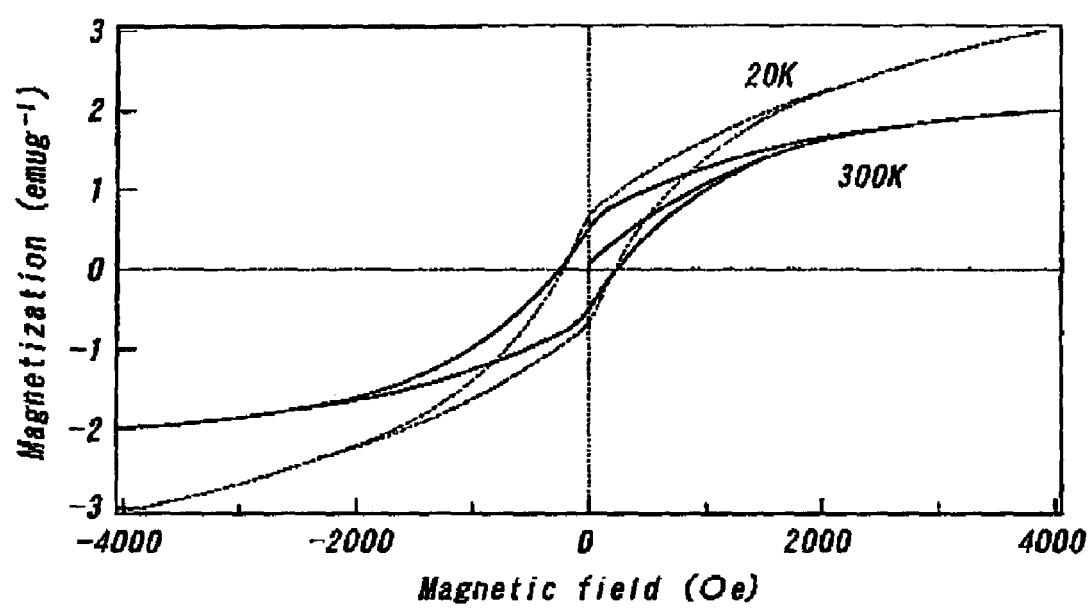
FIG. 5 is hysteresis curves of the sample fabricated according to the second method at 20K and 300K.

FIG. 4 is a hysteresis curve at 1.8 K of the magnetic clusters obtained by the first method, and FIG. 5 is hysteresis curves at 20 K and 300 K of magnetic clusters in amorphous carbon obtained by the second method. The concentration of the magnetic clusters in the latter sample is adjusted to approximately 10%. As is apparent from FIGS. 4 and 5, it is characteristic of the magnetic clusters in the present invention that the coercive force slightly increases at higher temperature.

Figure 6:
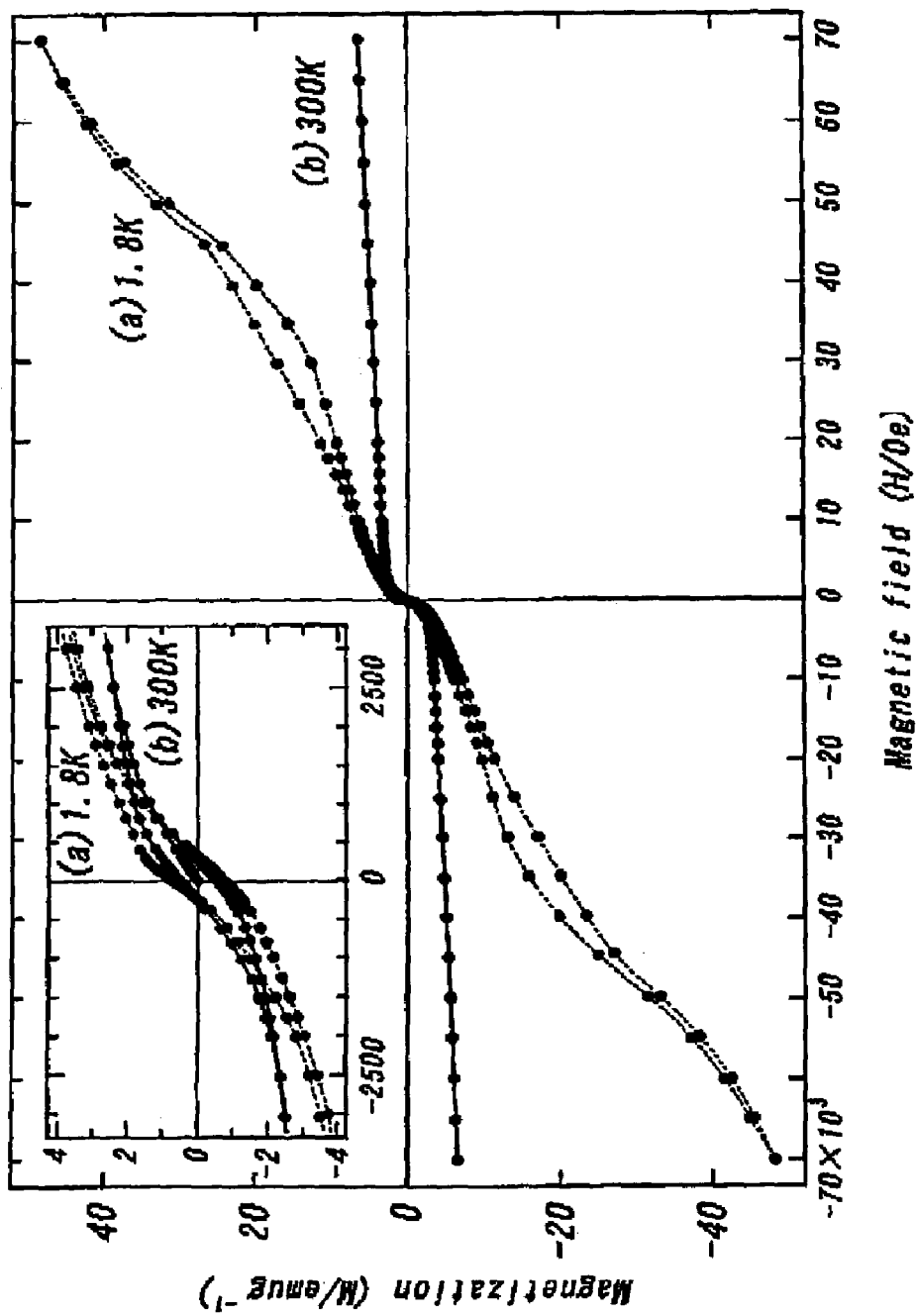
FIG. 6 is hysteresis curves of a sample with $CoCl_2$ which is not washed, fabricated according to the second method.

FIG. 6 is hysteresis curves at 1.8 K and 300 K of a magnetic cluster aggregative structure obtained without water washing. The diameter of the magnetic clusters is 12 nm. As is apparent from FIG. 6, the magnetic cluster aggregative structure with cobalt chloride exhibit ferrimagnetic property at 1.8 K because the magnetization of the aggregative structure is not saturated as the strength of the magnetic field is increased. A similar ferrimagnetic property is observed at 7 K.

In contrast, the magnetization of the magnetic cluster aggregative structure is almost saturated at 300K near room temperature as the strength of the magnetic field is increased though the saturated magnetization of the aggregative structure is small. Therefore, the magnetic cluster aggregative structure has magnetic property characteristic of the mixture of ferromagnetic cluster with super-paramagnetic substance.

The coercive force of the magnetic cluster aggregative structure is about 250 Gauss at both 1.8 K and 300 K. With the prevention of particle rotation, the coercive force of the magnetic cluster aggregative structure is enhanced to 500 Gauss or over.

Figure 7:
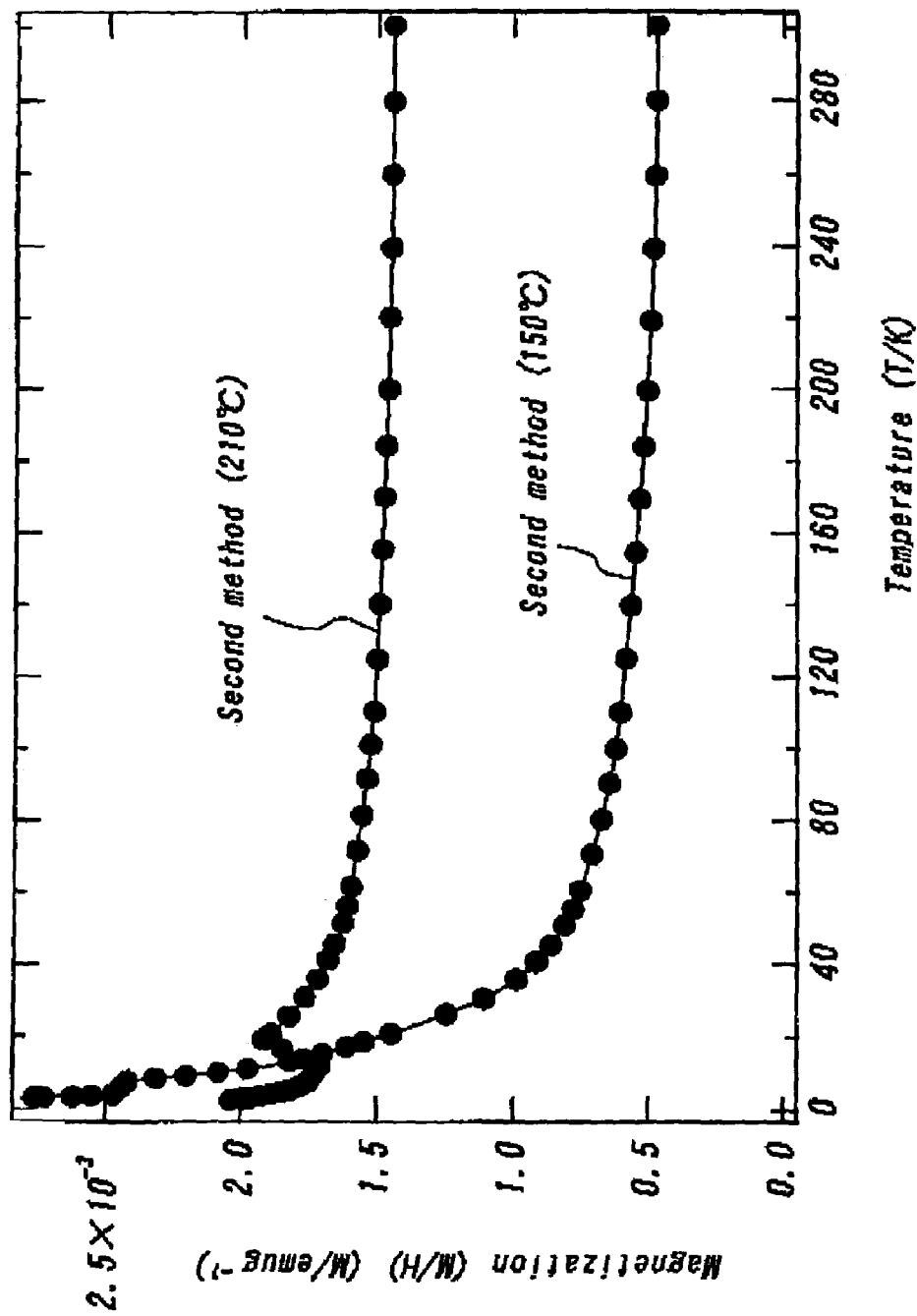
FIG. 7 is a graph showing a magnetization vs. temperature curve of the sample fabricated through the heating process at 150° C. and 210° C. according to the second method

FIG. 7 is a graph showing magnetization vs. temperature curves of magnetic clusters made by the second method when the upper heating temperature is set to 150° C. and 210° C. and the heating time is set to 6 hours. The concentration of the magnetic clusters is smaller than that shown in FIG. 5 in more than one order of magnitude. As is apparent in FIG. 7, the magnetization of the magnetic clusters fabricated at the heating temperature of 210° C. is larger than that fabricated at the heating temperature of 150° C., so that ferromagnetic components with large magnetic susceptibility are created in the magnetic cluster in the higher heating temperature at 210° C.

Although the present invention was described in detail with reference to the above examples, this invention is not limited to the above disclosure and every kind of variation and modification may be made without departing from the scope of the present invention.

As mentioned above, according to the present invention, a new magnetic cluster preferably usable as a conductive nano-scaled device or a magnetic memory in an ultrafine electronic device utilizing nano-technology can be provided. And a magnetic recording medium using the magnetic cluster can be provided. Also, methods for fabricating the magnetic cluster and the magnetic recording medium can be provided.

What is claimed is:

1. A magnetic cluster comprising a cluster of individual compounds, said compounds having a molecular formula $(CoC_2)_X$ (x: natural number), wherein said magnetic cluster has a $(CoC_2)_4$ tetragonal structure with Co-$C_2$-Co bonds, has a size of nanometer-order, and has a length of at least 3 nm and a diameter of at least 0.8 nm.

2. The magnetic cluster as defined in claim 1, exhibiting ferrimagnetic property within a range of 7 K or below with mixed with cobalt chloride.

3. The magnetic cluster as defined in claim 1, having at least one of ferromagnetic property and super-paramagnetic property at room temperature.

4. The magnetic cluster as defined in claim 1, having a coercive force of about 250 gauss or over.

5. An aggregative structure composed of a plurality of magnetic clusters according to claim 1, wherein said plurality of magnetic clusters are combined with one another.

6. The aggregative structure as defined in claim 5, having a diameter of not more than 12 nm.

* * * * *